United States Patent
Hatakeyama

(10) Patent No.: US 10,312,016 B2
(45) Date of Patent: Jun. 4, 2019

(54) CIRCULATING-CURRENT REDUCING CIRCUIT AND TRANSFORMER UNIT

(71) Applicant: SUMIDA CORPORATION, Chuo-ku, Tokyo (JP)

(72) Inventor: Takeshi Hatakeyama, Natori (JP)

(73) Assignee: SUMIDA CORPORATION (JP)

( * ) Notice: Subject to any disclaimer, the term of this patent is extended or adjusted under 35 U.S.C. 154(b) by 0 days.

(21) Appl. No.: 16/014,480

(22) Filed: Jun. 21, 2018

(65) Prior Publication Data

US 2019/0035541 A1   Jan. 31, 2019

(30) Foreign Application Priority Data

Jul. 28, 2017   (JP) .................................. 2017-147213

(51) Int. Cl.
*H01F 27/34* (2006.01)
*G05F 1/44* (2006.01)

(52) U.S. Cl.
CPC ............. *H01F 27/341* (2013.01); *G05F 1/44* (2013.01)

(58) Field of Classification Search
CPC .................................. H01F 27/341; G05F 1/44
See application file for complete search history.

(56) References Cited

U.S. PATENT DOCUMENTS

2015/0349649 A1 * 12/2015 Zane ................. H02M 3/33507
363/21.03

FOREIGN PATENT DOCUMENTS

| JP | S62-19606 A | 8/1987 |
|---|---|---|
| JP | H07-284271 A | 10/1995 |
| JP | 2004-289944 A | 10/2004 |

OTHER PUBLICATIONS

Extended European Search Report for EP Application No. 18185439.9, dated Dec. 4, 2018 (10 pages).

* cited by examiner

*Primary Examiner* — Jue Zhang
(74) *Attorney, Agent, or Firm* — Harness, dickey & Pierce, P.L.C.

(57) ABSTRACT

A circulating-current reducing circuit is provided that can suppress a circulating current with a simplified configuration having no control circuit. The circulating-current reducing circuit is connected to a transformer unit to reduce circulating current. The transformer unit includes: a first transformer device; a second transformer device that is connected to the first transformer device in parallel; and a switching element that controls timing of supply of current to a primary coil portion of the first transformer device and a primary coil portion of the second transformer device. The circulating-current reducing circuit includes a first circuit that is connected between the primary coil portion of the first transformer device and the switching element, and a second circuit that is connected between the primary coil portion of the second transformer device and the switching element.

14 Claims, 3 Drawing Sheets

CIRCULATING-CURRENT REDUCING CIRCUIT AND TRANSFORMER UNIT

BACKGROUND

Technical Field

The present invention relates to a circulating-current reducing circuit that reduces circulating current occurring in a transformer device, and a transformer unit including a transformer device having this circulating-current reducing circuit therein.

Related Art

Currently, various types of circuits provided with a transformer device are used in various applications, and there are many circuits having plural transformer devices connected therein. Not all of these transformer devices, which are included in these circuits, have the same specifications, and some have different specifications. It should be noted that the specifications of a transformer device as used herein mean parameters related to functions of the transformer device such as the number of turns in a coil or inductance of a coil of the transformer device.

The electric current supplied to the coil on the primary side of the transformer device is switched between ON and OFF at a certain frequency. At the time of switching of current from ON to OFF, circulating current flows from the higher impedance side to the lower impedance side in a closed loop formed on the primary side of plural transformer devices connected in parallel. The occurrence of circulating current causes ringing (abnormal) of current flowing in the circuit, which may cause a damage to elements in the circuit depending on the magnitude thereof.

For example, there is a switching power-source device described in Japanese Patent Application Laid-open No. H7-284271 as a known circuit for preventing the occurrence of circulating current. In the switching power-source device described in JP-H7-284271, plural switches are connected to the primary coils of the first transformer device and the second transformer device, and a capacitor is connected to each of the primary coil and the secondary coil. In addition, the switching power-source device described in JP-H7-284271 is provided with a control circuit that transmits signals to the plural switches to control them. The control circuit controls each of the switches so as to close or open in accordance with ON and OFF of the switching element, thereby controlling circulating current flowing between the primary coil of the first transformer and the primary coil of the second transformer.

However, the switching power-source device described above requires a control circuit that controls plural switches, which results in a disadvantage in terms of simplification and size-reduction of the entire device. In addition, if a high-functionality control circuit is used in such a switching power-source device to enhance the accuracy of control of the switches, this makes the device complicated, and may lead to an increase in cost thereof.

The present invention has been made in view of the fact described above, and relates to a circulating-current reducing circuit that, even with a simplified configuration having no control circuit used therein, can suppress the circulating current flowing between the primary coil of the first transformer device and the primary coil of the second transformer device, and also relates to a transformer unit including this circulating-current reducing circuit.

SUMMARY

An aspect of the present invention provides a circulating-current reducing circuit that is connected to a transformer unit to reduce circulating current occurring in the transformer unit, the transformer unit including:
a first transformer device;
a second transformer device that is connected to the first transformer device in parallel; and
a controlling element that controls timing of supply of current to a first primary coil portion on a primary side of the first transformer device and a second primary coil portion on a primary side of the second transformer device, the circulating-current reducing circuit including:
a first circuit that is connected between the first primary coil portion on the primary side of the first transformer device and the controlling element; and
a second circuit that is connected between the second primary coil portion on the primary side of the second transformer device and the controlling element.

Another aspect of the present invention provides a transformer unit, including:
a first transformer device;
a second transformer device that is connected to the first transformer device in parallel;
a controlling element that controls timing of supply of current to a first primary coil portion on a primary side of the first transformer device and a second primary coil portion on a primary side of the second transformer device;
a first circuit that is connected between the controlling element and the first primary coil portion; and
a second circuit that is connected between the controlling element and the second primary coil portion.

Effect of the Invention

The present invention can provide a circulating-current reducing circuit that, even with a simplified configuration having no control circuit used therein, can suppress circulating current flowing between the primary coil of the first transformer device and the primary coil of the second transformer device, and also can provide a transformer unit including this circulating-current reducing circuit.

DETAILED DESCRIPTION

Figure 1:
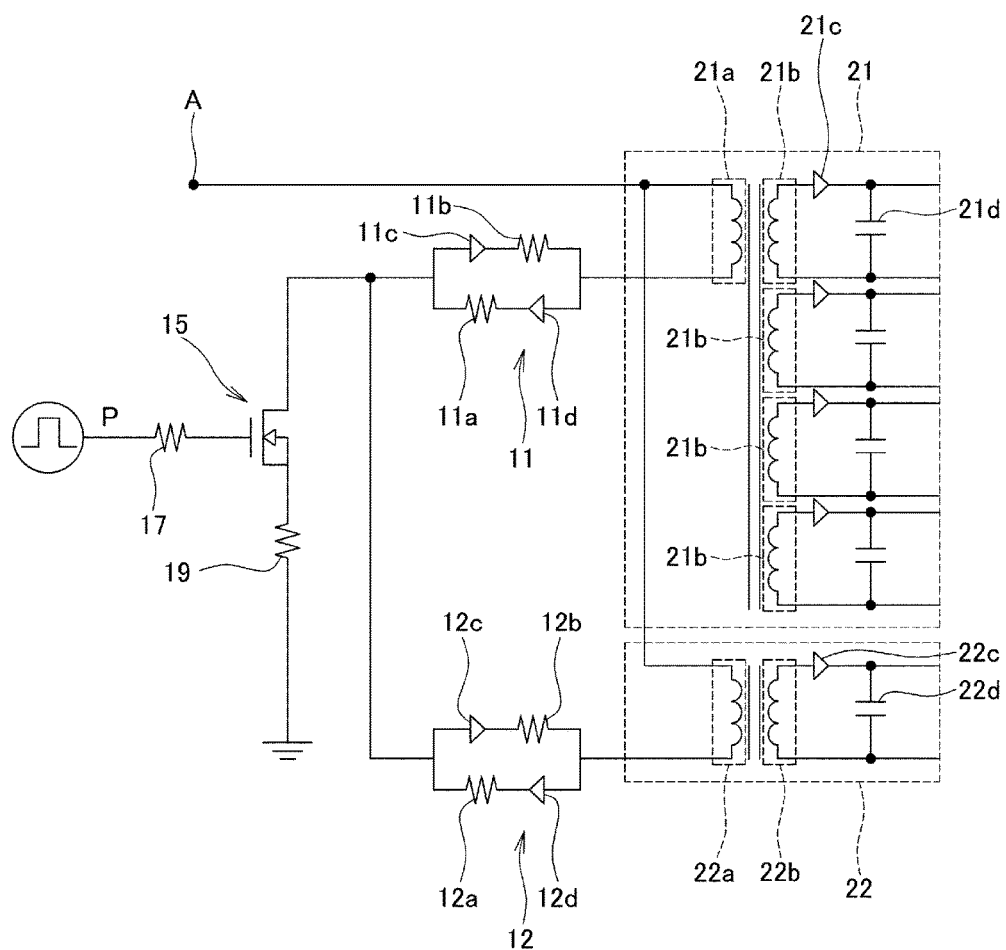
FIG. 1 is a diagram for explaining a transformer unit according to an exemplary embodiment of the present invention.

Hereinbelow, embodiments according to the present invention will be described with reference to the drawings. Note that, in all the drawings, similar constituent components are denoted by similar reference characters, and detailed explanation thereof will not be repeated as appropriate.

Transformer Unit

FIG. 1 is a diagram for explaining a transformer unit according to an exemplary embodiment of the present invention. The transformer unit 1 according to this exemplary embodiment includes two transformer devices: a transformer device 21 and a transformer device 22. The turns ratios of the coils of these two transformer devices 21, 22 differ from each other, and hence, impedances thereof also differ from each other. In the case of such a transformer unit 1, circulating current flows between the primary coil of a transformer device on a higher impedance side and the primary coil of a transformer device on a lower impedance side. The transformer unit 1 according to this exemplary embodiment includes a circulating-current reducing circuit that reduces such circulating current. The circulating-current reducing circuit is provided to eliminate ringing of electric current flowing in the transformer unit 1, and also to prevent elements constituting the transformer unit 1 from malfunctioning or being damaged due to excessive ringing.

The wording "reduce" as used herein means that circulating current occurs in the case where the transformer unit 1 has no circulating-current reducing circuit, or means that, in the case where the transformer unit 1 has no circulating-current reducing circuit, the occurring circulating current increases as compared with the case where the transformer unit 1 has the circulating-current reducing circuit.

The transformer unit 1 illustrated in FIG. 1 includes the transformer device 21 (first transformer device), and the transformer device 22 (second transformer device) connected to the transformer device 21 in parallel. The transformer unit 1 includes a first circuit 11 that is connected between a primary coil portion 21a (first primary coil portion) on the primary side of the transformer device 21 and a switching element 15 that serves as a controlling element that controls timing of supply of current to the primary coil portion 21a and a primary coil portion 22a (second primary coil portion) on the primary side of the transformer device 22. The transformer unit 1 also includes a second circuit 12 that is connected between the switching element 15 and the primary coil portion 22a.

The first circuit 11 and the second circuit 12 constitute the circulating-current reducing circuit that is connected to the transformer unit 1. In other words, the circulating-current reducing circuit according to this exemplary embodiment is connected to the transformer unit 1 including: the transformer device 21; the transformer device 22 that is connected to the transformer device 21 in parallel; and the switching element 15 that controls the timing of supply of current to the primary coil portion 21a on the primary side of the transformer device 21 and the primary coil portion 22a of the transformer device 22. In addition, the circulating-current reducing circuit according to this exemplary embodiment is included in a circulating-current reducing circuit that reduces circulating current occurring in the transformer unit 1.

Below, the configuration described above will be described in more detail.

Transformer Device

The transformer device 21 includes the primary coil portion 21a and a secondary coil portion 21b. The transformer device 22 includes the primary coil portion 22a and a secondary coil portion 22b. The term "coil portion" as used herein means a portion of a wire used to form each of the primary coil and the secondary coil, and this portion of the wire is wound around to form each of the coils. In addition, of the wire, a portion that forms the coil is also referred to as "winding." The primary coil portions 21a and 22a are located on the input side of the transformer devices 21 and 22, respectively, and the end portion of the wire that is connected to the primary coil portion 21a serves as the input terminal A on the primary side. The secondary coil portions 21b and 22b are located on the output side of the transformer devices 21 and 22, respectively.

In both of the transformer device 21 and the transformer device 22, the magnetic flux passing through the primary coil portion 21a, 22a changes if electric current is caused to flow in the primary coil portion 21a, 22a. The change in magnetic flux causes self-induced electromotive force to occur. In ideal transformer devices, the magnetic flux also changes in the secondary coil portion 21b, 22b by the amount that is the same as that occurred in the primary coil portion 21a, 22a, and mutually induced electromotive force occurs.

The occurrence of the mutually induced electromotive force causes current to flow in the secondary coil portion 21b. This current is rectified with a diode 21c. In addition, a capacitor 21d is connected on the output side of the transformer device 21 so as to be in series with the secondary coil portion 21b. From the current flowing in the secondary coil portion 21b, signals with a desired frequency are taken. Similarly, current flows in the secondary coil portion 22b, and this current is rectified with a diode 22c. In addition, a capacitor 22d is connected on the output side of the transformer device 22 so as to be in series with the secondary coil portion 22b. From the current flowing in the secondary coil portion 22b, signals with a desired frequency are taken.

In the case of such a transformer device 21, 22, the ratio n1/n2 of the number n1 of turns of the winding on the primary side relative to the number n2 of turns of the winding on the secondary side is equal to k·V1/V2 in which a ratio V1/V2 of the voltage V1 on the input side relative to the voltage V2 on the output side is multiplied by a coupling coefficient k. Thus, the number of turns of the winding of the transformer device 21, 22 is designed according to a desired ratio of transformation.

The transformer device 21, 22 is usually configured in a manner such that a copper wire having insulating coating thereon is wound around, for example, an iron core, or a copper wire is wound around, for example, a bobbin insulated from an iron core. The iron material used for the iron core preferably includes a magnetic substance such as a silicon steel plate, grain-oriented electrical steel, and ferrite. As for the insulating material that covers the copper wire, for example, silicone oil or synthetic resin is used. Note that some transformer device 21, 22 used at high frequencies may be configured without any iron core used therein.

Controlling Element

This exemplary embodiment gives an example in which a field effect transistor (FET) is used as the switching element 15 serving as the controlling element. The field effect transistor includes, for example, a metal oxide semiconductor (MOS) FET, a junction FET, and a metal semiconductor (MES) FET, and any of these transistors may be used. However, the switching element 15 according to this exemplary embodiment is not limited to the field effect transistor, and any element may be used provided that this element has a function of controlling flow or stop of the current. Thus, for example, a bipolar transistor may be used as the switching element 15.

The switching element 15 is provided between the input terminal A and the ground. The switching element 15 includes a gate terminal that receives a pulse voltage P input through a resistance element 17 from a pulse generator (not illustrated) that generates the pulse voltage P. The switching element 15 repeats ON and OFF according to the input of the pulse voltage P. When the switching element 15 is in the ON state, the input terminal A and the ground are made electrically continuous with each other to form a flow path of electric current supplied to the primary coil portion 21a, 22a. When the switching element 15 is in the OFF state, the flow path of the current supplied to the primary coil portion 21a, 22a is cut to stop supplying the current to the primary coil portion 21a, 22a. Thus, the frequency of operation of the transformer unit 1 is determined according to the frequency of the pulse voltage P applied to the switching element 15.

The magnetic flux occurring in the primary coil portion 21a and primary coil portion 22a reduces when the switching element 15 becomes OFF. The circulating current means electric current that is generated to compensate this reduction. A resistance element 19 is connected between the drain side of the switching element 15 and the ground side. The connection of the resistance element 19 may be omitted as appropriate.

Circulating-Current Reducing Circuit

The first circuit 11 that serves as the circulating-current reducing circuit is provided between the switching element 15 and the primary coil portion 21a. In addition, the second circuit 12 is provided between the switching element 15 and the primary coil portion 22a. The "circuit" as used in this exemplary embodiment means a closed loop of electric current in which electric elements are connected through electrical conductors. Thus, circuits that do not form a loop of electric current flowing between electrical elements are excluded from the circuit according to this exemplary embodiment.

In this exemplary embodiment, the first circuit 11 and the second circuit 12 have the same configuration. The first circuit 11 includes diodes 11c and 11d that each serve as a rectifier element that restricts the direction in which circulating current flows, and resistance elements 11a and 11b that each consume the circulating current. In addition, the second circuit 12 includes diodes 12c and 12d that each restrict the direction in which circulating current flows, and resistance elements 12a and 12b that each consume the circulating current.

Parameters (for example, threshold values) of the diodes 11c and 11d included in the first circuit 11 and those of the diodes 12c and 12d included in the second circuit 12 may be equal to each other or may be different from each other. In addition, parameters such as resistance values of the resistance elements 11a and 11b included in the first circuit 11 and those of the resistance elements 12a and 12b included in the second circuit 12 may be equal to each other or may be different from each other.

It should be noted that the expression "restrict the direction in which circulating current flows" as used herein means that, when voltage of equal to or more than a threshold value is applied from the diode 11c to the diode 12d, a portion from the diode 11c to the diode 12d functions to allow the electric current to flow only in a predetermined direction. In addition, the expression "consume the circulating current" as used herein means causing circulating current to circulate within a closed loop, thereby eliminating or reducing the component of the circulating current flowing outside of the closed loop.

In the first circuit 11, the diode 11c serves as a first rectifier element, and the resistance element 11b serves as a first resistance element. In addition, the diode 11d serves as a second rectifier element, and the resistance element 11a serves as a second resistance element. In the second circuit 12, the diode 12c serves as a first rectifier element, and the resistance element 12b serves as a first resistance element. In addition, the diode 12d serves as a second rectifier element, and the resistance element 12a serves as a second resistance element. The first circuit 11 is connected to the primary coil portion 21a in series. In addition, the second circuit 12 is connected to the primary coil portion 22a in series.

Furthermore, in the first circuit 11, the diode 11c and the resistance element 11b are connected in parallel with the diode 11d and the resistance element 11a. In addition, in the second circuit 12, the diode 12c and the resistance element 12b are connected in parallel with the diode 12d and the resistance element 12a.

In the configuration described above, standards of elements of the first circuit 11 such as resistance values of the resistance elements 11a and 11b and forward voltages of the diodes 11c and 11d are determined on the basis of electric current supplied from the input terminal A, frequencies at which the switching element 15 switches ON and OFF, occurring circulating current, and/or the like. Similarly, standards of elements of the second circuit 12 such as resistance values of the resistance elements 12a and 12b and forward voltages of the diodes 12c and 12d are also determined on the basis of electric current supplied from the input terminal A, frequencies at which the switching element 15 switches ON and OFF, occurring circulating current, and/or the like.

Operation

Next, operations of the transformer unit 1 described above will be described. Note that the operations described here are those performed during a period of time when the direction of alternating current supplied from the power supply (not illustrated) does not change. Once electric current is supplied from the input terminal A and the switching element 15 is in the ON state, a flow path of the current between the input terminal A and the ground is formed. At this time, the current supplied from the input terminal A flows through the primary coil portion 21a and the primary coil portion 22a, and the magnetic flux passing through the center of each of the primary coil portions 21a and 22a changes. The current that has flown through the primary coil portion 21a passes through the diode 11d and the resistance element 11a of the first circuit 11, and then, passes from the source of the switching element 15 in the ON state through the drain toward the ground.

Furthermore, the current that has passed through the primary coil portion 22a passes the diode 12d and the resistance element 12a of the second circuit 12, and then, passes from the source of the switching element 15 in the ON state through the drain toward the ground.

Next, when the switching element 15 switches into the OFF state, the flow path of electric current between the input terminal A and the ground is shut off. At this time, the current stops flowing through the primary coil portion 21a and the primary coil portion 22a, and the magnetic flux passing through the center of each of the primary coil portions 21a and 22a changes. This change in magnetic flux causes self-induced electromotive force to occur in a direction in which this change is cancelled, and this self-induced electromotive force causes circulating current to occur. The circulating current that has occurred in the primary coil portion 21a disappears during the course where the circulating current passes through the diode 11d, the resistance element 11a, the diode 11c, and the resistance element 11b of the first circuit 11. In addition, the circulating current that has occurred in the primary coil portion 22a disappear during the course where the circulating current passes through the diode 12d, the resistance element 12a, the diode 12c, and the resistance element 12b of the second circuit 12. In other words, in this exemplary embodiment, the circulating current disappears in the closed loops of the first circuit 11 or the second circuit 12.

With the exemplary embodiment in which circulating current disappears in the first circuit 11 or the second circuit 12, it is possible to prevent circulating current from leaking outside of the first circuit 11 and the second circuit 12, thereby being able to prevent the circulating current from having an effect on the transformer unit 1.

It should be noted that, in the operation described above, it is desirable that the circulating current disappears during the period of time from when the switching element 15 is in the ON state to when it is in the next ON state. Thus, it is preferable to determine the threshold values, at which the rectifying function works, of the diodes 11c, 11d, 12c, and 12d constituting the first circuit 11 or the second circuit 12 and the resistance values of the resistance elements 11a, 11b, 12a, and 12b, on the basis of, for example, frequencies of the pulse voltage applied to the switching element 15, the numbers of turns of the primary coil portion 21a and the primary coil portion 22a, and the amount of electric current supplied to the primary coil portion 21a and primary coil portion 22a. With this exemplary embodiment, by making the circulating current disappear before the next ON of the switching element 15, it is possible to prevent the circulating current from leaking into the electrical-current path formed between the input terminal A and the ground, thereby being able to prevent the circulating current from having an effect on the transformer unit 1 as ringing.

Furthermore, in the case of the first circuit 11 according to this exemplary embodiment, the flow of current from the transformer device 21 toward the ground is not blocked during the period of time when the switching element 15 is being ON. Similarly, in the case of the second circuit 12, the flow of current from the transformer device 22 toward the ground is not blocked during the period of time when the switching element 15 is being ON. To achieve these states, in this exemplary embodiment, the first circuit 11 is set such that the resistance value of the resistance element 11b and the diode 11c and the resistance value of the resistance element 11a and the diode 11d are each set to be lower than the impedance of the primary coil portion 21a. In addition, the second circuit 12 is set such that the resistance value of the resistance element 12b and the diode 12c and the resistance value of the resistance element 12a and the diode 12d are each set to be lower than the impedance of the primary coil portion 22a.

It should be noted that the resistance value of a diode as used herein means a resistance value thereof until the voltage across the diode reaches a threshold value of voltage at which the diode starts to work as a rectifier element.

With this exemplary embodiment described above, it is possible to eliminate circulating current only by connecting the first circuit 11 and the second circuit 12 to the transformer unit 1. Thus, according to this exemplary embodiment, it is possible to suppress circulating current flowing between the primary coil of the first transformer device and the primary coil of the second transformer device even with a simplified configuration having no control circuit used therein. In addition, according to this exemplary embodiment, it is possible to form the first circuit 11 and the second circuit 12 with simplified circuits including diodes and resistance elements. With this exemplary embodiment described above, the circulating current occurring disappears only by passing it through the circuit, and hence, it is possible to more simplify the circuit configuration. In addition, with this exemplary embodiment, by adjusting the specifications of diodes and/or resistance elements, each of which constitutes the first circuit 11 and the second circuit 12, it is possible to set the first circuit 11 and the second circuit 12 so as to have any function. Thus, according to this exemplary embodiment, it is possible to obtain a circulating-current reducing circuit that is suitable to eliminate circulating current according to the amount of the circulating current or timing of the switching element 15 switching ON and OFF.

Effect

Here, description will be made of an effect of the circulating-current reducing circuit according to this exemplary embodiment described above.

Figure 2A:
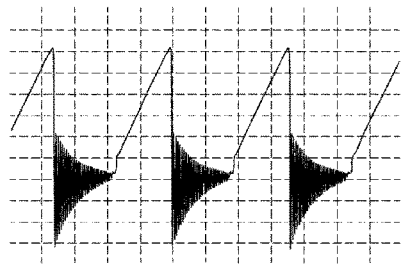
FIGS. 2A-2H are diagrams for explaining an effect of the circulating-current reducing circuit according to the exemplary embodiment of the present invention.
Figure 2B:
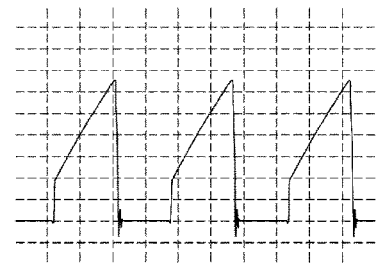
Figure 2C:
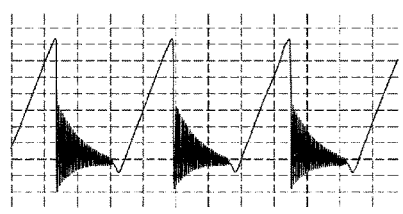
Figure 2D:
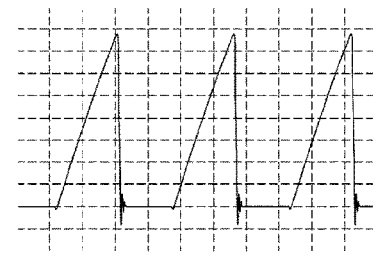

FIGS. 2A-2H are diagrams for explaining the effect of the circulating-current reducing circuit (the first circuit 11 and the second circuit 12) according to this exemplary embodiment. In FIGS. 2A-2H, the vertical axis represents the magnitude of electric current or voltage, and the horizontal axis represents time. FIG. 2A shows the current (the input current into the transformer device 21) input into the primary coil portion 21a of the transformer device 21 of a transformer unit (hereinafter, referred to as "Comparative Example") having neither the first circuit 11 or the second circuit 12 of the transformer unit 1 illustrated in FIG. 1. FIG. 2B shows the input current into the transformer device 21 according to this exemplary embodiment. FIG. 2C shows the current (the input current into the transformer device 22) input into the primary coil portion 22a of the transformer device 22 according to Comparative Example. FIG. 2D shows the input current into the transformer device 22 according to this exemplary embodiment.

Figure 2E:
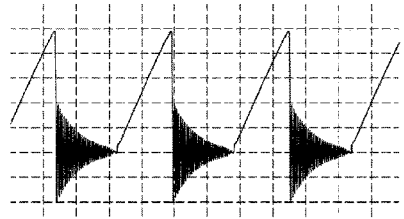
Figure 2F:
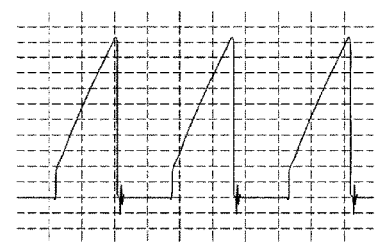
Figure 2G:
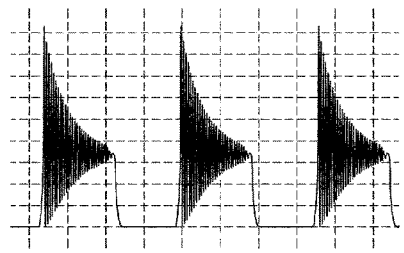
Figure 2H:
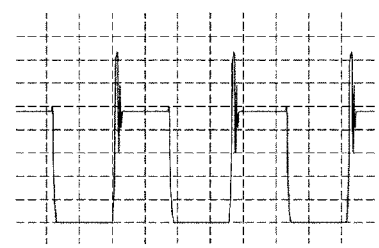

FIG. 2E shows drain current flowing through the drain of the switching element 15 according to Comparative Example. FIG. 2F shows drain current flowing through the drain of the switching element 15 according to this exemplary embodiment. FIG. 2G shows drain voltage between the source and the drain of the switching element 15 according to Comparative Example. FIG. 2H shows drain voltage of the switching element 15 according to this exemplary embodiment.

As illustrated in FIGS. 2A-2F, the input current and the drain current in each of the cases each form a saw-tooth wave with a constant frequency. The frequency of the saw-tooth wave depends on a frequency of ON-OFF of the switching element 15. In the examples from FIGS. 2A-2H, the switching element 15 is in the ON state from the rising edge of a saw-tooth wave to the falling edge thereof, whereas the switching element 15 is in the OFF state from the falling edge of the saw-tooth wave to the rising edge of the next saw-tooth wave. In addition, as illustrated in FIG. 2G and FIG. 2H, the drain voltage of the switching element 15 has a shape of rectangular wave according to a pulse voltage P applied to the gate terminal of the switching element 15. In this exemplary embodiment, the switching element 15 is in the ON state from the rising edge of a rectangular wave to the falling edge thereof, whereas the switching element 15 is in the OFF state from the falling edge of the rectangular wave to the rising edge of the next rectangular wave.

As can be clearly understood from FIGS. 2A, 2C, 2E, and 2G, in the case of Comparative Example, ringing occurs in the falling edge of the output current of the transformer device 21 and the transformer device 22. In addition, ringing also occurs in the rising edge of the drain voltage on the primary side. On the other hand, as illustrated in FIGS. 2B, 2D, 2F, and 2H, in the case of the transformer unit 1 according to this exemplary embodiment, no ringing is observed in any of the output current, the drain current, and drain voltage. On the basis of these facts, it is considered that, in the transformer unit 1 according to this exemplary embodiment, the first circuit 11 and the second circuit 12, servings as the circulating-current reducing circuit, reduce circulating current, and also suppress ringing.

Modification Example

Furthermore, as described above, this exemplary embodiment is not limited to the configuration in which the first circuit 11 and the second circuit 12 are connected to the locations illustrated in FIG. 1. The first circuit 11 and the second circuit 12 may be disposed at other locations in the transformer unit 1. However, in the transformer unit 1, the state on the side of the primary coil portion 21a with respect to the switching element 15 needs to be equal to the state on the side of the primary coil portion 22a. This "state" means, for example, a state of elements being connected. For example, in FIG. 1, the switching element 15, the first circuit 11, and the primary coil portion 21a are connected sequentially on the side of the primary coil portion 21a. In addition, the switching element 15, the second circuit 12, and the primary coil portion 22a are connected sequentially on the side of the primary coil portion 22a.

As described above, in this exemplary embodiment, the first circuit 11 and the second circuit 12 are set such that, in the case where the first circuit 11 is disposed on the upstream side (high-voltage side) of the primary coil portion 21a, the second circuit 12 is connected upstream of the primary coil portion 22a. In addition, in this exemplary embodiment, in the case where the first circuit 11 is disposed on the downstream side (low-voltage side) of the primary coil portion 21a, the second circuit 12 may be connected downstream of the primary coil portion 22a.

Here, the expression "on the upstream side (high-voltage side) of the primary coil portion" means a node through which electric current passes before passing through the primary coil portion. In addition, the expression "on the downstream side (low-voltage side) of the primary coil portion" means a node through which electric current passes after passing through the primary coil portion. Note that, since alternating current flows in the transformer unit 1, the upstream and the downstream (the high-voltage side and the low-voltage side) of the primary coil portion 21a, 22a change according to the flowing direction of the alternating current. In this exemplary embodiment, the upstream side of the primary coil portion indicates a node on the side where, at a certain point in time, electric current passes before passing through the primary coil portion. In addition, the downstream side of the primary coil portion indicates a node on the side where, at a point in time which is the same as the above-described certain point in time, electric current passes after passing through the primary coil portion.

Figure 3:
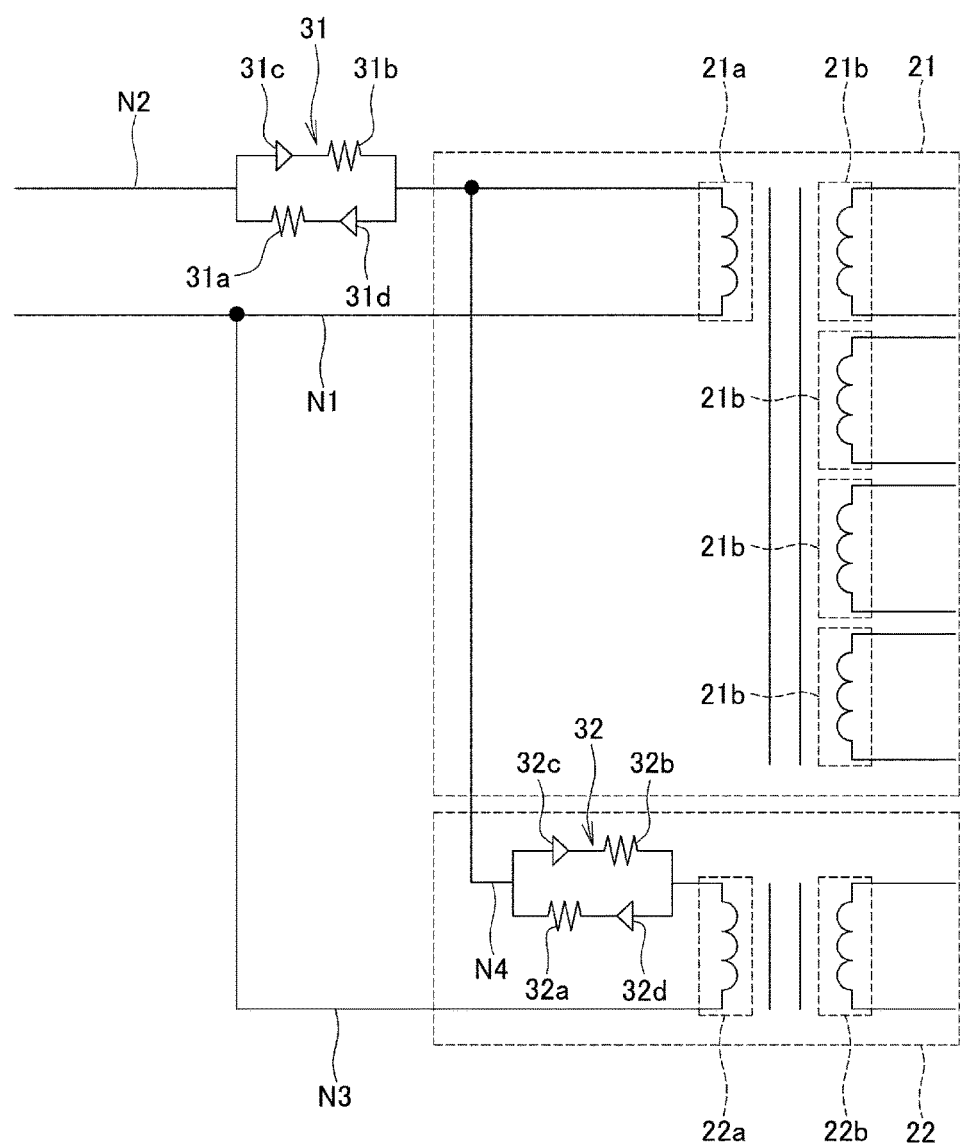
FIG. 3 is a diagram for explaining a modification example of the exemplary embodiment according to the present invention.

FIG. 3 shows a portion of the transformer unit according to a modification example in an enlarged manner. In FIG. 3, a node from the input terminal A illustrated in FIG. 1 to the primary coil portion 21a is denoted as N2, and a node from the primary coil portion 21a toward the switching element 15 is denoted as N1. In addition, in FIG. 3, a node from the input terminal A to the primary coil portion 22a is denoted as N4, and a node from the primary coil portion 22a toward the switching element 15 is denoted as N3.

In the previously described transformer unit 1, the first circuit 11 is disposed in the node N1 illustrated in FIG. 3, and the second circuit 12 is disposed in the node N3 illustrated in FIG. 3. The arrangement of the first circuit 11 and the second circuit 12 illustrated in FIG. 1 shows an example in which the first circuit 11 and the second circuit 12 are disposed on the downstream side (low-voltage side) of the primary coil portion 21a, 22a.

On the other hand, in the modification example illustrated in FIG. 3, a first circuit 31 is disposed in the node N2, and a second circuit 32 is disposed in the node N4. The arrangement of the first circuit 31 and the second circuit 32 illustrated in FIG. 3 is an example in which the first circuit 31 and the second circuit 32 are disposed on the upstream side (high-voltage side) of the primary coil portion 21a, 22a.

The first circuit 31 includes diodes 31c and 31d and resistance elements 31a and 31b, as with the first circuit 11. In addition, the second circuit 32 includes diodes 32c and 32d and resistance elements 32a and 32b, as with the second circuit 12. According to this exemplary embodiment, with the first circuit 31 and the second circuit 32 being disposed at the locations described above, it is possible to reduce circulating current in the transformer unit, and it is also possible to prevent these circuits from interfering with normal operations of the transformer unit.

It should be noted that the exemplary embodiment described above is not limited to the modes described above. For example, the transformer unit according to this exemplary embodiment is not limited to the configuration in which two transformer devices are connected, and it may be possible to employ a configuration in which any number of transformer devices are connected. In addition, in the case where three or more transformer devices are connected, this exemplary embodiment is not limited to the configuration in which all the connected transformer devices have different specifications, and this exemplary embodiment may be applied to a configuration in which at least part of the specifications differs from each other.

Furthermore, this exemplary embodiment is not limited to the configuration in which the diodes and the resistance elements in the first circuit and the second circuit are connected in parallel. The first circuit and the second circuit each have any specific configuration, provided that these circuits can enclose the occurring circulating current within a closed loop, and can eliminate the occurring circulating current.

The exemplary embodiments and the example described above include the following technical ideas.

1 A circulating-current reducing circuit that is connected to a transformer unit to reduce circulating current occurring in the transformer unit,
the transformer unit including:
a first transformer device;
a second transformer device that is connected to the first transformer device in parallel; and
a controlling element that controls timing of supply of current to a first primary coil portion on a primary side of the first transformer device and a second primary coil portion on a primary side of the second transformer device,
the circulating-current reducing circuit including:
a first circuit that is connected between the first primary coil portion on the primary side of the first transformer device and the controlling element; and
a second circuit that is connected between the second primary coil portion on the primary side of the second transformer device and the controlling element.

2 The circulating-current reducing circuit according to 1, in which
in a case where the first circuit is disposed upstream of the first primary coil portion in the first transformer device, the second circuit is disposed upstream of the second primary coil portion in the second transformer device, and
in a case where the first circuit is disposed downstream of the first primary coil portion in the first transformer device, the second circuit is disposed downstream of the second primary coil portion in the second transformer device.

3 The circulating-current reducing circuit according to 1 or 2, in which
the first circuit and the second circuit each include a rectifier element that restricts a direction in which the circulating current flows, and a resistance element that consumes the circulating current.

4 The circulating-current reducing circuit according to 3, in which
the first circuit and the second circuit include a first rectifier element, a first resistance element, a second rectifier element, and a second resistance element,
the first circuit is connected to the first primary coil portion in series,
the second circuit is connected to the second primary coil portion in series, and
the first rectifier element and the first resistance element are connected in parallel to the second rectifier element and the second resistance element.

5 The circulating-current reducing circuit according to 4, in which
in the first circuit, a resistance value of the first resistance element and the first rectifier element and a resistance value of the second resistance element and the second rectifier element are each lower than an impedance of the first primary coil portion, and
in the second circuit, a resistance value of the first resistance element and the first rectifier element and a resistance value of the second resistance element and the second rectifier element are each lower than an impedance of the second primary coil portion.

6 A transformer unit, including:
a first transformer device;
a second transformer device that is connected to the first transformer device in parallel;
a controlling element that controls timing of supply of current to a first primary coil portion on a primary side of the first transformer device and a second primary coil portion on a primary side of the second transformer device;
a first circuit that is connected between the controlling element and the first primary coil portion; and
a second circuit that is connected between the controlling element and the second primary coil portion.

This application is based on Japanese Patent Application No. 2017-147213, filed on Jul. 28, 2017, the entire content of which is expressly incorporated herein by reference.

What is claimed is:

1. A circulating-current reducing circuit that is connected to a transformer unit to reduce circulating current occurring in the transformer unit,
the transformer unit including:
a first transformer device having a first primary coil on a primary side thereof, the first primary coil having a first impedance;
a second transformer device that is connected to the first transformer device in parallel, the second transformer device having a second primary coil on a primary side thereof, the second primary coil having a second impedance; and
a controlling element configured to control supply timing of current to the first primary coil and the second primary coil,
the circulating-current reducing circuit comprising:
a first circuit that is connected between the first primary coil and a note of the controlling element, the first circuit being connected to the first primary coil in series, the first circuit having a first rectifier element and a first resistance element; and
a second circuit that is connected between the second primary coil and the controlling element, the second circuit being connected to the second primary coil in series, the second circuit having a second rectifier element and a second resistance element,
wherein the first rectifier element and the first resistance element are connected in parallel to the second rectifier element and the second resistance element,
wherein a resistance value of the first rectifier element and the first resistance element is lower than each of the first impedance and the second impedance, and
a resistance value of the second rectifier element and the second resistance element is lower than each of the first impedance and the second impedance.

2. The circulating-current reducing circuit according to claim 1, wherein
when the first circuit is disposed upstream of the first primary coil, the second circuit is disposed upstream of the second primary coil, and
when the first circuit is disposed downstream of the first primary coil, the second circuit is disposed downstream of the second primary coil.

3. The circulating-current reducing circuit according to claim 1,
wherein the first circuit is a first closed loop circuit by connecting the first rectifier element and the first resistance element in series, and
the second circuit is a second closed loop circuit by connecting the second rectifier element and the second resistance element in series.

4. The circulating-current reducing circuit according to claim 3,
wherein the first circuit has a third rectifier element and a third resistance element, the first and third rectifier elements and the first and third resistance elements are alternately connected in series to form the first closed loop circuit, and
the second circuit has a fourth rectifier element and a fourth resistance element, the second and fourth rectifier elements and the second and fourth resistance elements are alternately connected in series to form the second closed loop circuit.

5. The circulating-current reducing circuit according to claim 4,
wherein a current rectifying direction of each of the first and second rectifier elements is opposite to a current rectifying direction of each of the third and fourth rectifier elements.

6. A transformer unit comprising:
a first transformer device having a first primary coil on a primary side thereof, the first primary coil having a first impedance;

a second transformer device that is connected to the first transformer device in parallel, the second transformer device having a second primary coil on a primary side thereof, the second primary coil having a second impedance;

a controlling element configured to control supply timing of current to the first primary coil and the second primary coil;

a first circuit that is connected between the controlling element and the first primary coil, the first circuit being connected to the first primary coil in series, the first circuit having a first rectifier element and a first resistance element; and a second circuit that is connected between the controlling element and the second primary coil, the second circuit being connected to the second primary coil in series, the second circuit having a second rectifier element and a second resistance element, wherein the first rectifier element and the first resistance element are connected in parallel to the second rectifier element and the second resistance element, wherein a resistance value of the first rectifier element and the first resistance element is lower than each of the first impedance and the second impedance, and a resistance value of the second rectifier element and the second resistance element is lower than each of the first impedance and the second impedance.

7. The transformer unit according to claim 6, wherein when the first circuit is disposed upstream of the first primary coil, the second circuit is disposed upstream of the second primary coil, and when the first circuit is disposed downstream of the first primary coil, the second circuit is disposed downstream of the second primary coil.

8. The transformer unit according to claim 6, wherein the first circuit is a first closed loop circuit by connecting the first rectifier element and the first resistance element in series, and the second circuit is a second closed loop circuit by connecting the second rectifier element and the second resistance element in series.

9. The transformer unit according to claim 8, wherein the first circuit has a third rectifier element and a third resistance element, the first and third rectifier elements and the first and third resistance elements are alternately connected in series to form the first closed loop circuit, and the second circuit has a fourth rectifier element and a fourth resistance element, the second and fourth rectifier elements and the second and fourth resistance elements are alternately connected in series to form the second closed loop circuit.

10. The transformer unit according to claim 9, wherein a current rectifying direction of each of the first and second rectifier elements is opposite to a current rectifying direction of each of the third and fourth rectifier elements.

11. A circulating-current reducing circuit that is connected to a transformer unit to reduce circulating current occurring in the transformer unit, the transformer unit including:
a first transformer device;
a second transformer device that is connected to the first transformer device in parallel; and
a controlling element that controls timing of supply of current to a first primary coil portion on a primary side of the first transformer device and a second primary coil portion on a primary side of the second transformer device, the circulating-current reducing circuit including:
a first circuit that is connected in series only between one end of the first primary coil and a node of the controlling element, the first circuit having a first rectifier element and a first resistance element; and
a second circuit that is connected in series only between one end of the second primary coil and the node of the controlling element, the second circuit having a second rectifier element and a second resistance element, wherein the first circuit is a first closed loop circuit by connecting the first rectifier element and the first resistance element in series, and the second circuit is a second closed loop circuit by connecting the second rectifier element and the second resistance element in series, and when the circulating current is generated between the first primary coil and the second primary coil, the first and second rectifier elements are configured to restrict a current flow direction of the circulating current and the first and second resistance elements are configured to consume the circulating current so that the first and second circuits are configured to reduce the circulating current flowing outside the first and second circuits.

12. The circulating-current reducing circuit according to claim 11, wherein when the first circuit is disposed upstream of the first primary coil, the second circuit is disposed upstream of the second primary coil, and when the first circuit is disposed downstream of the first primary coil, the second circuit is disposed downstream of the second primary coil.

13. The circulating-current reducing circuit according to claim 11, wherein the first circuit has a third rectifier element and a third resistance element, the first and third rectifier elements and the first and third resistance elements are alternately connected in series to form the first closed loop circuit, and the second circuit has a fourth rectifier element and a fourth resistance element, the second and fourth rectifier elements and the second and fourth resistance elements are alternately connected in series to form the second closed loop circuit.

14. The circulating-current reducing circuit according to claim 13, wherein a current rectifying direction of each of the first and second rectifier elements is opposite to a current rectifying direction of each of the third and fourth rectifier elements.

* * * * *